US012633655B2

(12) United States Patent
Pinto

(10) Patent No.: US 12,633,655 B2
(45) Date of Patent: May 19, 2026

(54) BIASING STRUCTURES

(71) Applicant: BAE SYSTEMS plc, London (GB)

(72) Inventor: Jonathan Pinto, Chelmsford Essex (GB)

(73) Assignee: BAE SYSTEMS PLC, London (GB)

( * ) Notice: Subject to any disclaimer, the term of this patent is extended or adjusted under 35 U.S.C. 154(b) by 631 days.

(21) Appl. No.: 18/006,244

(22) PCT Filed: Jun. 30, 2021

(86) PCT No.: PCT/GB2021/051660

§ 371 (c)(1),
(2) Date: Jan. 20, 2023

(87) PCT Pub. No.: WO2022/018397

PCT Pub. Date: Jan. 27, 2022

(65) Prior Publication Data

US 2023/0275348 A1 Aug. 31, 2023

(30) Foreign Application Priority Data

Jul. 20, 2020 (EP) .................................... 20275121
Jul. 20, 2020 (GB) ..................................... 2011129

(51) Int. Cl.
*H01Q 3/26* (2006.01)
*H01Q 3/46* (2006.01)
(Continued)

(52) U.S. Cl.
CPC ............. *H01Q 3/2676* (2013.01); *H01Q 3/46* (2013.01); *H01Q 15/0086* (2013.01); *H01Q 21/065* (2013.01)

(58) Field of Classification Search
CPC .... H01Q 3/2676; H01Q 3/46; H01Q 15/0086; H01Q 21/065; H01Q 15/0066;
(Continued)

(56) References Cited

U.S. PATENT DOCUMENTS 4,295,058 A 10/1981 Lade et al.
4,629,880 A 12/1986 Zimmermann
(Continued)

FOREIGN PATENT DOCUMENTS

CN 109326888 A * 2/2019 ......... H01Q 15/0086
WO 2018140829 A1 8/2018
WO 2022018397 A1 1/2022

OTHER PUBLICATIONS

P. Kapitanova et al., "Light-controllable magnetic metamaterials based on loaded split-ring resonators," Proceedings of the 2012 IEEE International Symposium on Antennas and Propagation, Chicago, IL, USA, 2012, pp. 1-2, doi: 10.1109/APS.2012.6348088. (Year: 2012).*

(Continued)

*Primary Examiner* — Fernando L Toledo
*Assistant Examiner* — Jorge Andres Lopez
(74) *Attorney, Agent, or Firm* — Arcane Law PLLC

(57) ABSTRACT

In some examples, a biasing structure for a unit cell of a meta-surface comprises a first illumination source to irradiate a first photovoltaic element, the first photovoltaic element so configured as to generate a biasing current to bias an active asymmetrically conducting device bridging a pair of electrically separated conductive patches defining a surface of the unit cell.

19 Claims, 7 Drawing Sheets

(51) Int. Cl.
*H01Q 15/00* (2006.01)
*H01Q 21/06* (2006.01)

(58) Field of Classification Search
CPC ........... H01Q 3/00; Y02E 10/50; G02F 1/015; G02F 2203/24; G02B 1/02; H10F 10/00
See application file for complete search history.

(56) References Cited

U.S. PATENT DOCUMENTS

| | | | |
|---|---|---|---|
| 6,078,111 A | 6/2000 | Sun et al. | |
| 2014/0211298 A1 | 7/2014 | Sayyah et al. | |
| 2017/0294720 A1 | 10/2017 | Murakowski et al. | |
| 2018/0109002 A1 | 4/2018 | Foo | |
| 2019/0081618 A1 | 3/2019 | Liu et al. | |
| 2020/0227632 A1* | 7/2020 | Kim | G02B 26/06 |

OTHER PUBLICATIONS

International Search Report and Written Opinion received for PCT/GB2021/051660. Mailed: Sep. 30, 2021. 16 pages.
GB Search Report under Section 17(5) received for GB Application No. 2011129.0, dated Jan. 19, 2021. 4 pages.
Combined Search and Examination Report under Sections 17 and 18(3) received for GB Application No. 2109422.2, dated Dec. 16, 2021. 7 pages.
Extended European Search Report received for EP Application No. 20275121.0, dated Jan. 13, 2021. 16 pages.
Kapitanova, et al., "Light-controllable Magnetic Metamaterials Based on Loaded Split-ring Resonators," IEEE, Jul. 2012. 2 pages.

* cited by examiner

BIASING STRUCTURES

TECHNICAL FIELD

Aspects relate, in general, to biasing structures, and more specifically, although not exclusively, to biasing structures for use in unit cells of metasurfaces.

BACKGROUND

A metasurface is a quasi-two-dimensional structure comprising a periodic (or aperiodic) array of individual elements that interact with incident electromagnetic (EM) radiation. Re-configurable or multifunction metasurfaces that are based on such structures can comprise multiple modes of operation. As such, incident EM waves, such as radiofrequency (RF) radiation for example, can be manipulated by controlling the local phase of the subwavelength artificial structures that define the individual elements of these metasurfaces.

In many such surfaces the individual elements are in the form of individually addressable unit cells. These unit cells comprise active components such as PIN or varactor (varicap) diodes that enable the amplitude or phase of the reflection/transmission co-efficient of a particular region of the metasurface to be varied, thereby enabling the manipulation of an incident EM wave.

Generally, biasing wires are used to drive the individual active components by the application of direct currents, thereby turning the diodes 'on' or 'off', or by varying the capacitance of reverse-biased Varactor diodes. Accordingly, bias wiring must be accounted for in the RF design of the metasurface since currents are induced on them by incident RF radiation which, in turn, affects the reflection characteristics of the metasurface. If the bias wiring is not incorporated into a model representing the RF performance a metasurface will generally not perform as expected from an electrical perspective. In order to mitigate the effects of current induced on the bias wiring inductors can be used to help isolate them at high frequencies, thus effectively functioning as chokes. In this way. DC or low frequency current used to bias the individual elements of the metasurface is still able to flow, whilst RF currents at much higher frequencies are presented with a high impedance. Nevertheless, even using this approach alternating currents can still be induced in the region of a bias wire between a patch of the elements and the inductor, which must be accounted for in any simulation of RF performance.

SUMMARY

According to an example, there is provided a biasing structure for a unit cell of a meta-surface, the biasing structure comprising a first illumination source to irradiate a first photovoltaic element, the first photovoltaic element so configured as to generate a biasing current to bias an active asymmetrically conducting device bridging a pair of electrically separated conductive patches defining a surface of the unit cell.

The effect of bias lines that would normally be used are overcome. Accordingly, a metasurface based on such a biasing structure is easier to design since, for example, the use of a large number of potentially cumbersome long bias wires emanating from the sides or back of the metasurface is avoided, whilst retaining the ability to individually address particular unit cells in the surface. Due to the absence of bias wiring, there is no induced RF current that would otherwise travel down the wiring interfering with the operation of the metasurface.

In an implementation, a second illumination source to irradiate the first photovoltaic element can be provided. The first and second illumination sources can be individually addressable whereby to enable irradiation of the first photovoltaic element by either one or both of the illumination sources. The biasing structure can further comprise a spacing element to separate an illumination source from the first photovoltaic element. The first photovoltaic element can be disposed on an inner face of the surface of the unit cell. The active asymmetrically conducting device can be disposed on an outer face of the surface of the unit cell. In an example, an anode of the active asymmetrically conducting device can be electrically connected to one of the pair of electrically separated patches, and a cathode of the active asymmetrically conducting device can be electrically connected to the other of the pair of electrically separated patches. The active asymmetrically conducting device can be a PIN diode, or a varactor diode.

The first and second illumination sources can be connected logically in parallel. The first and second illumination sources can have unequal forward voltages, whereby to enable sequential or selected illumination thereof.

In an implementation, the biasing structure can further comprise a second photovoltaic element. The first photovoltaic element and the second photovoltaic element can be so configured as to generate the biasing current. The biasing structure can comprise or be mounted on a ground plane. The ground plane can be defined by a portion of a surface of a platform. The ground plane can define an aperture to receive an illumination source, whereby to enable irradiation of a photovoltaic element. The ground plane can be optically transparent and electrically conductive.

The biasing structure can further comprise a low-loss optically transparent structure so positioned as to define an optical coupling between an illumination source and a photovoltaic element.

According to an example, a biasing structure as provided herein can form part of a reflect-array structure.

The biasing structure can further comprise a spacing structure so configured as to direct light from an illumination source to a photovoltaic element. The spacing structure can comprise a low-loss optically transparent material.

According to an example, there is provided a unit cell of a metasurface, the unit cell comprising a biasing structure as provided herein.

According to an example, there is provided a metasurface comprising an array of unit cells as provided herein. A number of unit cell array geometries are possible, one example being, each unit cell in the array of unit cells can be hexagonal and can be arranged on a triangular pitch. Hexagonal unit cells arranged on a triangular pitch have been found to give improved angular performance when beam steering.

According to an example, there is provided a reflect-array comprising a metasurface as provided herein, the reflect-array configured to beamform a signal incident on the metasurface by controlling a phase of respective ones of the unit cells.

According to an example, there is provided a system comprising a reflect-array as provided herein and an antenna configured to emit the signal of the reflect-array.

BRIEF DESCRIPTION OF THE DRAWINGS

For a more complete understanding of the present disclosure, reference is now made, by way of example only, to the following descriptions taken in conjunction with the accompanying drawings, in which.

DESCRIPTION

Figure 2:
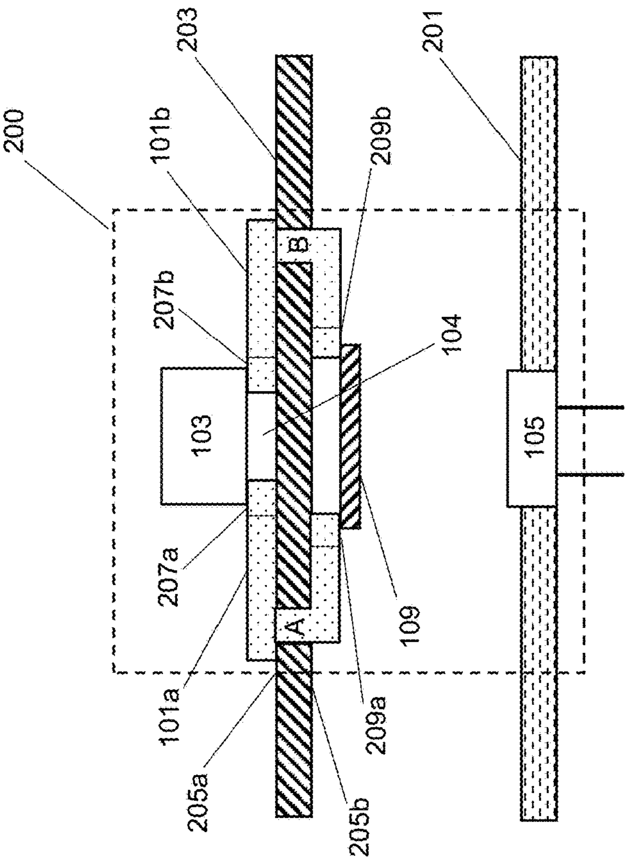
FIG. 2 is a schematic representation of a unit cell according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context dearly indicates otherwise. It will be further understood that the terms "comprises." "comprising." "includes," and/or "including," when used herein, specify the presence of stated features, items, steps, operations, elements, and/or components, but do not preclude the presence or addition of one or more other features, items, steps, operations, elements, components, and/or groups thereof.

Figure 1:
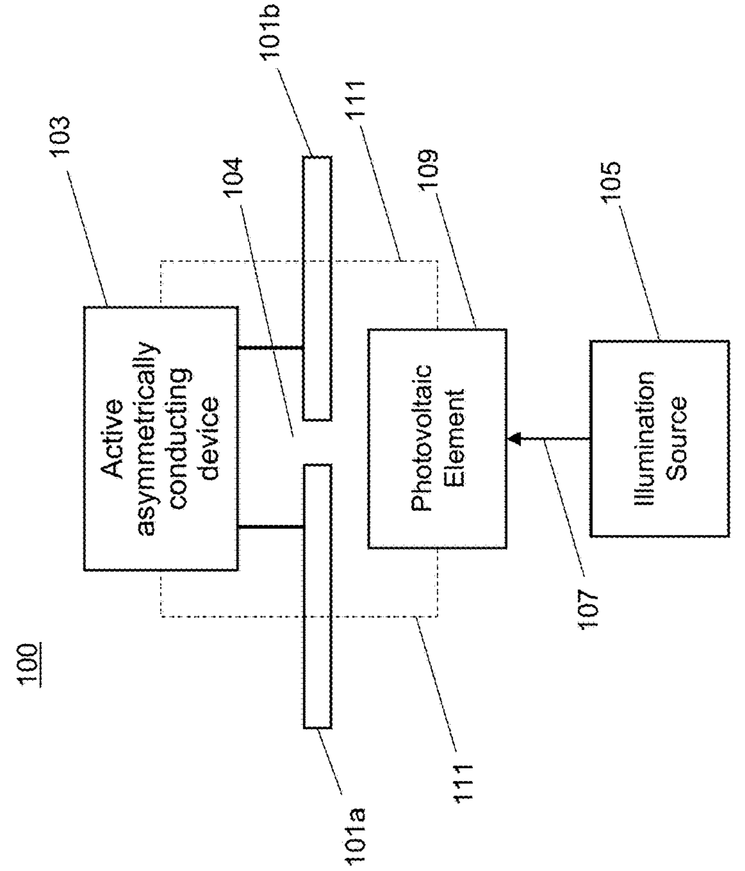
FIG. 1 is a schematic representation of biasing structure according to an example.

FIG. 1 is a schematic representation of biasing structure according to an example. In the example of FIG. 1, which is presented as a side-on view, the biasing structure 100 is configured to enable the boundary conditions experienced by a signal, such as an RF signal, incident on a metasurface to be varied, thereby enabling control of the interaction between the incident signal and the surface for the purposes of, e.g., beam steering and so on. The biasing structure 100 obviates the requirement for bias lines that are used to provide a DC bias signal.

The biasing structure can be used to bias a device 103. The bias device 103 is logically positioned between a pair of conductive patches 101*a*, 101*b* for the unit cell. Applying a bias signal to the device 103 enables modification of an effective conductive area for an incident signal by bridging an electrically insulating gap 104 between the patches 101*a*, 101*b*.

In an implementation, the biasing structure 100 comprises a first illumination source 105 that is used to irradiate (107) a first photovoltaic element 109. The first photovoltaic element 109 is so configured as to generate a biasing current 111 to bias an active asymmetrically conducting device 103, thereby bridging the pair of electrically separated conductive patches 101*a*, 101*b* defining a surface of the unit cell.

As such, the effect of the bias lines that would normally be used to bias the device are overcome. This makes a metasurface based on such a biasing structure easier to design since, for example, the use of a large number of potentially cumbersome long bias wires emanating from the sides or back of the metasurface is avoided, whilst retaining the ability to individually address particular unit cells in the surface. Accordingly, due to the absence of bias wiring, there is no induced RF current that would otherwise travel down the wiring interfering with the operation of the metasurface.

FIG. 2 is a schematic representation of a unit cell according to an example. In the example of FIG. 2, the unit cell 200 can be repeated over one or two dimensions to form a metasurface. Device 103 is shown in situ on a pair of conductive patches 101*a*, 101*b*. More specifically, terminals of device 103 are provided on corresponding terminal portions 207*a*, 207*b* of the unit cell 200, whereby to provide a bias signal to device 103.

The first illumination source 105, which can be an encapsulated photovoltaic (PV) cell or photodiode (operated in zero-bias, photovoltaic mode) for example, is provided in (or on) a ground plane 201. The ground plane may be defined by the skin of a platform upon which a metasurface according to an example is provided. For example, the ground plane 201 may comprise a conductive portion of a vehicular or static structural platform.

In the example of FIG. 2, a substrate 203, such as a double-sided copper clad PCB for example, is patterned (e.g. photoetched) such that the upper surface 205*a* consists of patches 101*a*, 101*b*, and pads 207*a*. 207*b*. Pads 207*a*, 207*b* are electrically separated from another and define positive and negative terminals to receive corresponding terminals of device 103. In implementation, patches 101*a*, 101*b*, and pads 207*a*, 207*b* may be unitary or integral with one another. However, regardless, patches 101*a*, 101*b*, and pads 207*a*, 207*b* are electrically connected so as to enable a bias signal to pass to device 103.

The lower surface 205*b* is patterned with bias lines and pads 209*a*, 209*b* for the first photovoltaic element 109, which can be a PV cell/photodiode for example. Plated through vias A, B, ensure that an electrical connection exists between the upper layer and the bias lines connected to the pads 209*a*. 209*b*.

Accordingly, terminals of the first photovoltaic element 109 are electrically connected to patches 101*a*, 101*b*, and pads 207*a*, 207*b*, thereby enabling a signal generated by the first photovoltaic element 109 in the form of, e.g. a DC bias voltage, to be passed to device 103 in order to bias it. Biasing of device 103 results in the gap 104 between the patches 101*a*, 101*b* being bridged, which modifies the boundary conditions relating to a conductive area of the unit cell 200. In an example, a PV cell/photodiode 109 can be illuminated by a single LED 105 positioned through an aperture in the ground plane 201.

The configuration described with reference to FIG. 2 means that the bias lines are electrically short and are not directly exposed to significant field strengths. As such, they can be neglected, to first order, in the RF design prediction of a metasurface composed from such unit cells.

In an example, a foam/honeycomb spacer can be used with a series of holes (in the case of the foam, machined from above prior to assembly for example) to position the substrate 203 approximately one quarter wavelength (of the RF radiation to be incident on a metasurface composed of unit cells according to an example) away from a, e.g., copper, aluminium or similarly metallic ground plane 201. Such holes allow light to propagate from the, e.g. LED 105, onto the surface of the PV cell/photodiode 109. In an example, the spacer material is opaque at the wavelength of the optical radiation generated by the source 105 in order to avoid light scattering into adjacent unit cells. Thus, by turning-on the LED 105, a PIN diode 103 can be biased in the centre of the unit cell 200 without interfering with the operation of adjacent unit cells.

Figure 3:
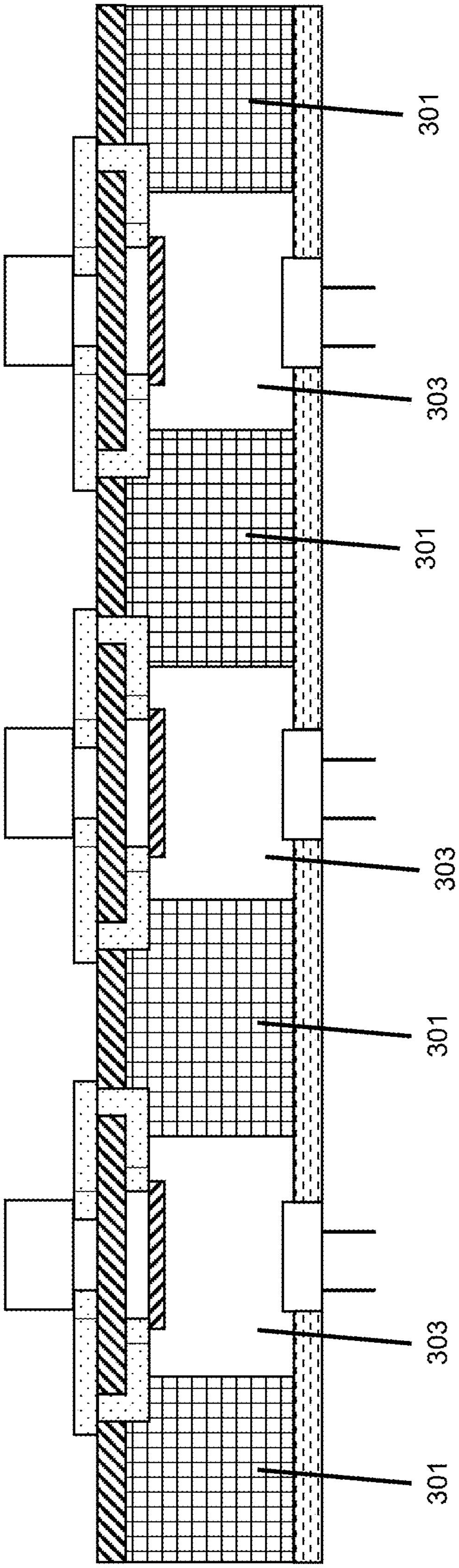
FIG. 3 is a schematic representation of an arrangement of multiple ones of the unit cell of FIG. 2 according to an example.

FIG. 3 is a schematic representation of an arrangement of multiple unit cells of FIG. 2. In the example of FIG. 3, three such unit cells are depicted, in a side view. Foam/honeycomb spacers 301 are depicted. Areas 303 intermediate the spacers 301 are holes/free space. Areas 303 may comprise an optical spacer in addition to or in place of spacers 301. The optical spacer can be configured to act as a waveguide to direct light from a source in or on the ground plane to a photovoltaic device of a unit cell.

Figure 4:
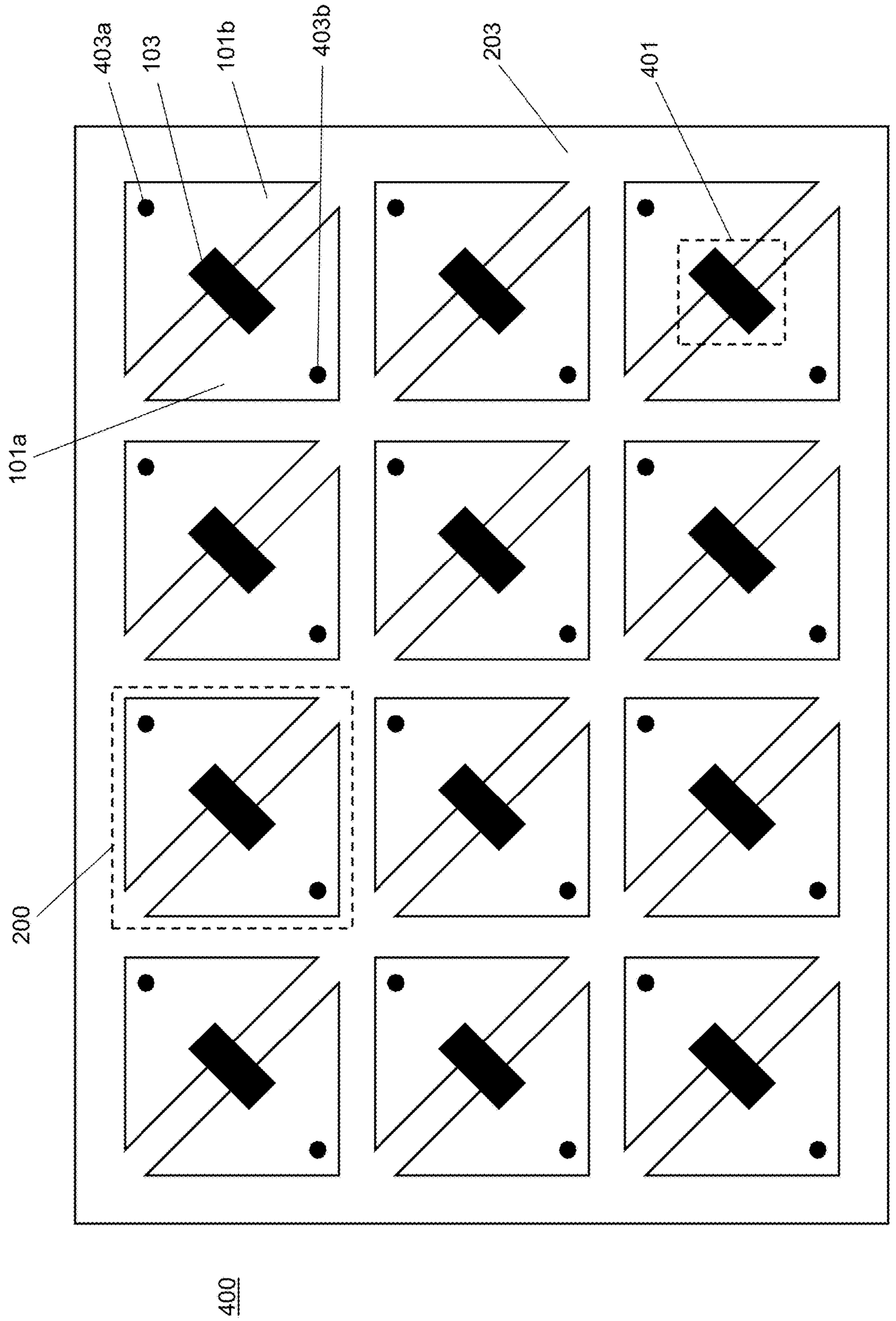
FIG. 4 is a schematic representation of a metasurface according to an example.

FIG. 4 is a schematic representation of a metasurface according to an example. In the example of FIG. 4, an array of 12 unit cells (4×3) forms a metasurface 400. An array of unit cells may be larger or smaller than that depicted. In the arrangement of FIG. 4, as viewed from above, each unit cell 200 is of approximately half wavelength side length, with the device 103 (e.g. PIN diode or varactor) bridging a pair of conductive patch elements 101*a*, 101*b*, which in the example of FIG. 4 are in the form of a pair of isosceles triangular patches. Each conductive patch comprises a through plated via 403*a*, 403*b* to the PV cell/photodiode 109 on the underside 205*b* of the substrate board 203. This permits dual polar operation using a single diode. The extent of a photovoltaic element 109 (e.g. PV cell) on the underside 205*b* substrate 203 is depicted by dashed line 401.

Other patch type shapes and arrangements will also function as will be apparent to those skilled in the art. The biasing device 103 changes the available path for currents induced by the radiation incident on the metasurface 400. Consequently, this permits a change in the amplitude and phase of the scattered field for the biased versus unbiased condition of a unit cell 200.

In the example of FIG. 4, device 103 can be a PIN diode or a varactor. However, for the configuration of FIG. 4, PIN diodes are generally more suitable than varactors because the voltage developed by the PV cell/photodiode does not vary significantly with the intensity of incident light from the source 105 once the semiconductor's turn-on voltage has been reached. However, by contrast, the current does. This enables two states to be realised for each unit cell 200, e.g. OFF and ON. The unit cell geometry can be designed such that a significant phase shift exists for the reflection coefficient between the two states. Using this implementation, adjacent cells can be changed in 'state' to achieve, for example, a particular far-field radiation pattern, thus controlling beam shape, beam direction and null steering as required in relation to an incident signal.

In an example, a metasurface such as that described with reference to FIG. 4, may be used as part of a reflective array antenna, or reflect array suitable for, e.g., beamforming. A metasurface, comprising an array of unit cells as described herein, can define an aperture of a reflect array. Incident RF signals can be provided using a horn or similar antenna such as a microwave feed antenna located off-axis in front of the reflect array so that it is 'space fed'. Although this provides an imperfect plane wave in phase terms, the bias states of the individual unit cells can be set to correct for this. Such an antenna will produce a well-defined beam with a uniformity of phase across the aperture when sampled in the far-field. With a suitable feed antenna, mounted along the centre axis, the surface is suitable for the reflection of circularly polarised radiation. A feed antenna can therefore be used to 'illuminate' the metasurface. A current will therefore be induced in the patch elements of the unit cells of the metasurface, and reflection of the incident signal is dictated by the pattern of the induced current, which can be controlled by adjusting the states of the individually addressable unit cells of the metasurface. That is, by changing the phase of the reflection coefficient the shape of a signal scattered/reflected from the metasurface can be changed.

In an implementation, the frequency of operation of such a reflect array will be dictated by the pitch of each unit cell 200, since this must generally be of the order of half a wavelength at the operating frequency. Furthermore, the patches 101*a*, 101*b* are sized so that they are not smaller than the PV cell/photodiode on the underside of the substrate 203, which itself should be capable of generating sufficient current to ensure that the p-n junction in the PIN diode, for example, remains open. Commonly available PV cells and photodiodes may be used and can be as small as, e.g., 5 mm square. In an example, the area of a PV cell is such as to ensure that sufficient voltage and current exists through the depletion region of the PIN diode, thus maintaining a conductive channel for the RF radiation. Considering, for example, a 5 mm side length cell implies an element pitch of around 7 mm (assuming 1 mm for the pads). Given an, e.g., 1 mm gap between elements the highest wavelength of operation in such an implementation will be of the order of 16 mm, corresponding to a frequency of around 18 GHz.

In the example of FIG. 4, based on an array of unit cells such as those described with reference to FIGS. 2 and 3 for example, two states can be presented to incident radiation ('OFF' and 'ON,' for example). Variations in phase across the surface are thus implemented using different arrangements of these states as a function of position over the surface. The situation is analogous to using phase shifters behind every element of an array but where the phase shifters themselves employ one 'bit'.

According to an example, a metasurface can be formed from unit cells using varactor diodes as the active component, rather than PIN diodes. Each varactor can be fed by a number of, e.g., photodiodes in zero bias mode each with an accompanying source, such as an LED. In the ground plane. In an implementation, the varactors are each reverse biased, and the photodiodes are connected in parallel but are of unequal turn-on voltage.

Figure 5:
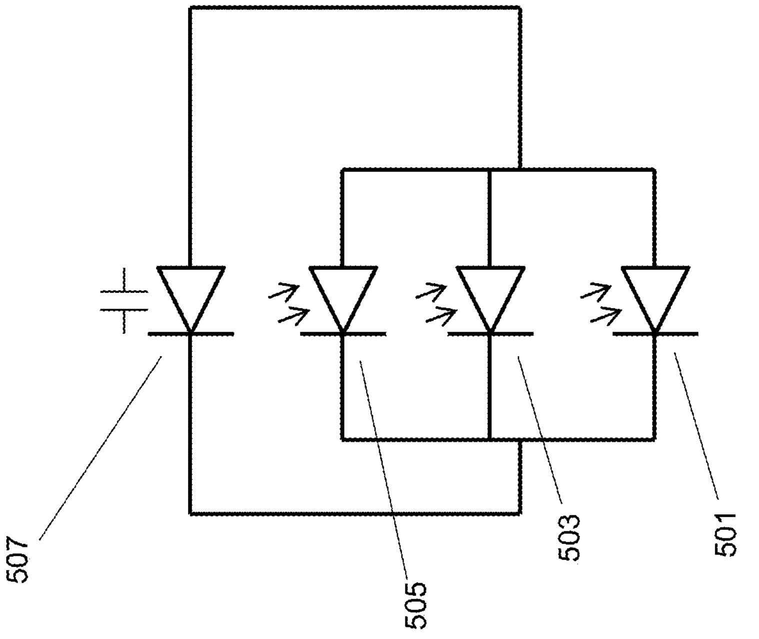
FIG. 5 is a schematic representation of a multi-bit implementation according to an example.

FIG. 5 is a schematic representation of a multi-bit implementation according to an example. In the example of FIG. 5 three photodiodes, 501, 503 and 505 can be illuminated sequentially (one at a time). In an example, the photodiodes have different open circuit voltages and are individually driven by separate LEDs. For example, photodiode 501 can have an open circuit voltage of 1V, photodiode 503 can have an open circuit voltage of 2V. and photodiode 505 can have an open circuit voltage of 3V.

Accordingly, the potential difference across the (reverse biased) varactor 507 can be increased as the photodiodes are sequentially illuminated. This increases the width of the depletion region of the varactor 507 and so decreases its capacitance. In the arrangement of FIG. 5 there are thus four bias states of the varactor, including the no voltage condition. In practice, more or fewer biasing photodiodes (and/or corresponding light sources) can be used according to the space available and the 'bit depth' required.

By illuminating different LEDs, corresponding to particular photodiodes 501-505, the capacitance of a unit cell can be decreased, thus changing the phase of the reflection co-efficient of the patch structure in response to RF illumination and thus modifying a scattered field. A 4-bit arrangement, such as that shown in FIG. 5 for example (3 diodes plus zero bias), would thus have reflection co-efficient phase angles stepping between 0°, 90°, 180° and 270°. This is different to conventional multi-bit phase shifters which operate cumulatively (i.e. 4 bits might be I80°, 90°, 45° and 22.5° with multiples of these being achievable).

Figure 6:
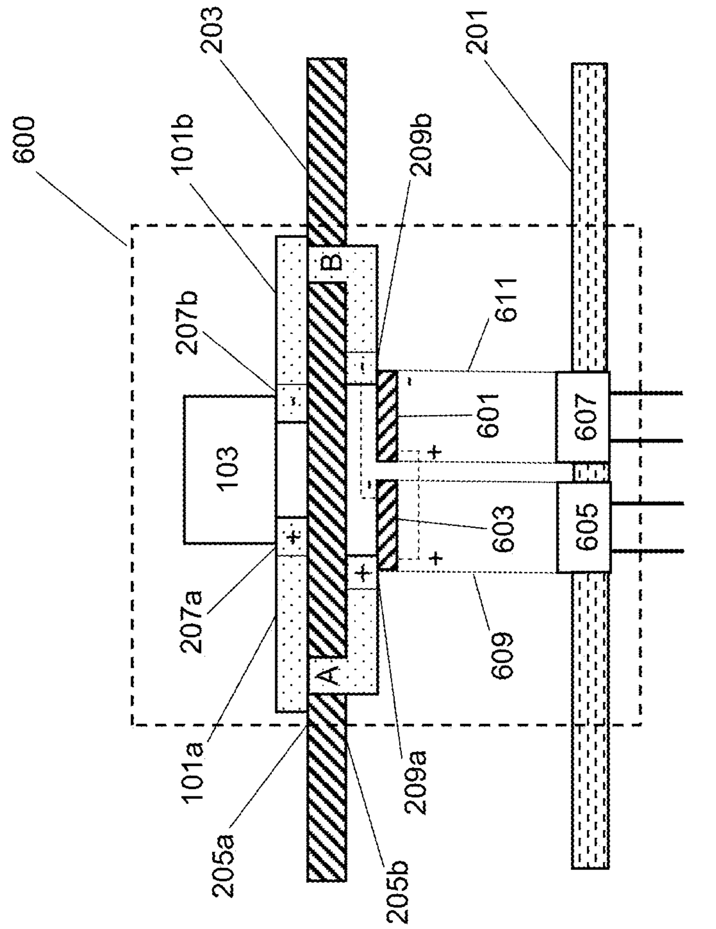
FIG. 6 is a schematic representation of a of a unit cell according to an example.

FIG. 6 is a schematic representation of a of a unit cell according to an example. In the example of FIG. 6, the unit cell 600 can be repeated over one or two dimensions to form a metasurface. In this particular example, two photodiodes arranged in parallel, 601, 603 provide three possible states based on sequential illumination of the light sources 605, 607. More LEDs can be used. It will also be appreciated that a three-state implementation is depicted for the sake of clarity, with no less of generality, and that more photodiodes may be used as desired with a corresponding increase in the number of light sources. Generally, N diodes gives N+1 available states. Similarly to the example of FIG. 2, a foam type material and/or optical spacer can be provided between unit cells to restrict leakage of light from the illumination sources 605, 607.

Unit cells 600 thus provide more degrees of freedom such that they enable multi-'bit' Implementations. In an example, the photodiodes 601, 603 can be positioned so that they are spaced off the lower surface **205*b* of the substrate 203 and thus close to the illuminating LEDs 605, 607. In an example, instead of foam type material (or in addition thereto) a push-fit black tube (e.g. plastic) can be used to ensure direct optical coupling between an LED and the corresponding photodiode. The position of such tubes is depicted by 609, 611 for each photodiode/LED pair 603/605 (tube 609), 601/607 (tube 611**). Additional photodiodes and LEDs can be used as desired. Such an optical coupling is suitable for use with any of the examples described herein.

According to an example, unit cells such as those described above can be implemented using an optically transparent (but electrically conductive) material for the ground plane 201, such as indium tin oxide (ITO) for example. This obviates the need to machine holes in a conventional metallic ground plane to position the LEDs. Thus, surface mount LEDs can be used as a replacement for more conventional through-hole type LEDs, reducing physical size and the overall depth required for a unit cell, which can then help to minimise the overall thickness and mass of an array forming a metasurface.

Furthermore, optical coupling from a surface mount LED to a photodiode (and isolation from adjacent stray light caused by LEDs in the same or nearby unit cells) may be achieved by the use of artificially produced fibre optic cables or structures. A low-loss optically transparent plastic can be used for this purpose, forming a dielectric spacing structure. Suitable materials include Perspex, polycarbonate, Nylon, or PLA for example. The spacing structure can thus consist of short 'castellations' of plastic material extending from the ground plane 201 to the underside **205*b* of the upper substrate 203**.

Figure 7:
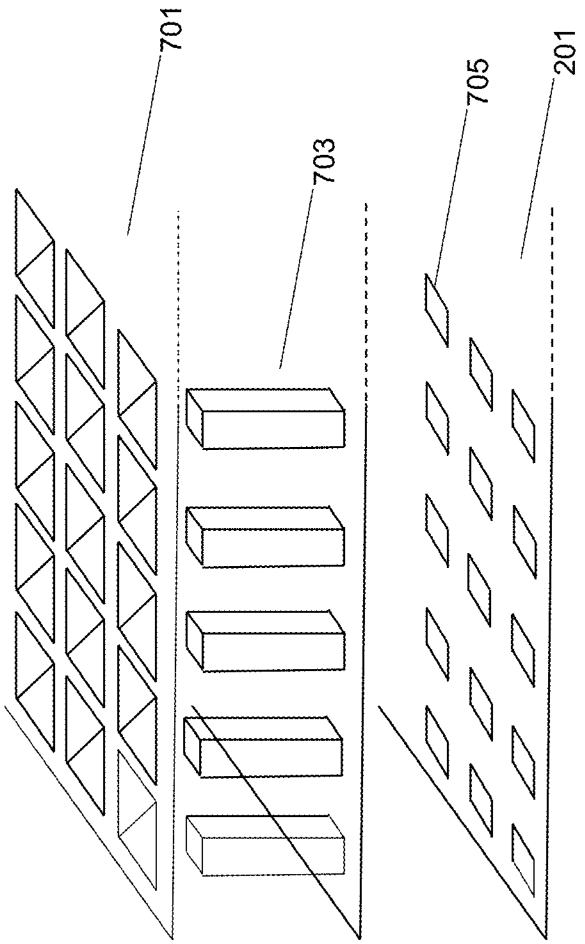
FIG. 7 is a schematic representation of an arrangement using a spacing structure according to an example.

FIG. 7 is a schematic representation of an arrangement using a spacing structure according to an example. In the example of FIG. 7, for the sake of clarity, one LED per unit cell is depicted and the structure is depicted in an exploded form. An upper layer 701 comprising conducting patch elements is depicted above a ground plane 201. Polymer spacing structures 703 are provided to transfer light from lower LEDs 705 (e.g. SMT—surface mount LEDs) to photodiodes. The ground plane 201 can comprise a PCB layer with SMT LEDs, either Cu-Clad or with an ITO coating for example. The PCB may be copper clad so that it continues to act as a ground plane, or the ITO coating may be positioned above the LEDs.

In another example, 'through-hole' LEDs can be used that are inserted into a block of transparent plastic. The spacing structures can be machined into an upper block (or the block can be 3D printed) from the same material, whilst a layer of ITO can be sandwiched between them acting as the ground plane.

Figure 8:
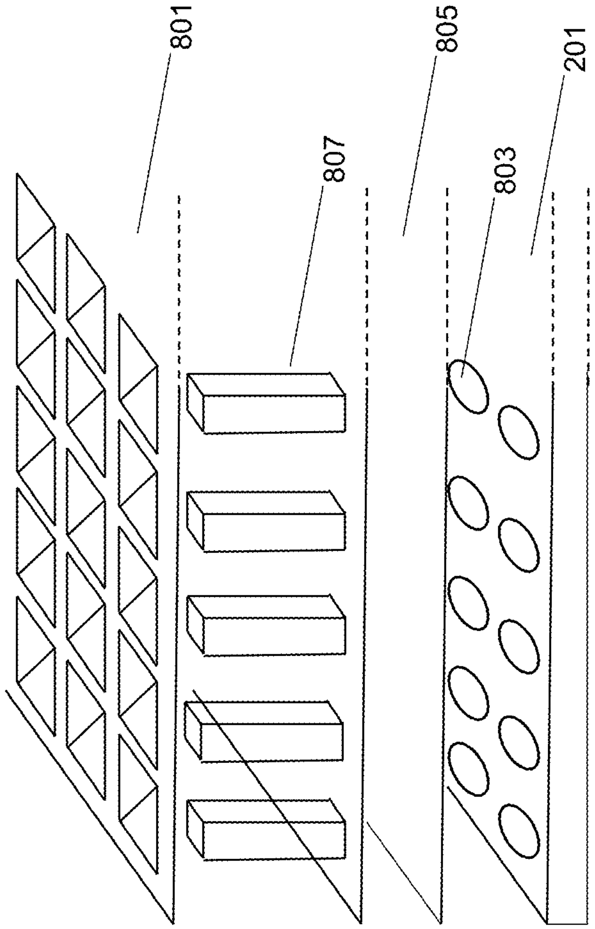
FIG. 8 is a schematic representation of an arrangement using a spacing structure according to an example.

FIG. 8 is a schematic representation of an arrangement using a spacing structure according to an example. In the example of FIG. 8, for the sake of clarity, one LED per unit cell is depicted and the structure is depicted in an exploded form. An upper layer 801 comprising conducting patch elements is depicted above a ground plane 201. In an example, the ground plane can comprise a polymer layer with holes 803 for LEDs. A layer 805 is provided formed from, for example, ITO on mylar (polyester) or Kapton (polyimide) film, onto which polymer castellations 807 can be 3D printed/machined to transfer light from lower LEDS to photodiodes.

If required, natural light can be excluded by use of a thin optically opaque polymer on the upper surface, bottom and edges for example. Alternatively, the photodiodes can be made sensitive only to light over specific wavelengths such as around the 1400 nm and 1900 nm water absorbency bands in the near-infra red (NIR). Little natural light of these wavelengths reaches the Earth's surface due to atmospheric absorption. Hence, by the use of filtering or the selection of photodiodes which are sensitive predominantly to light of these wavelengths, it is possible to engineer a screen without the need for traditional screening from sunlight.

Figure 9:
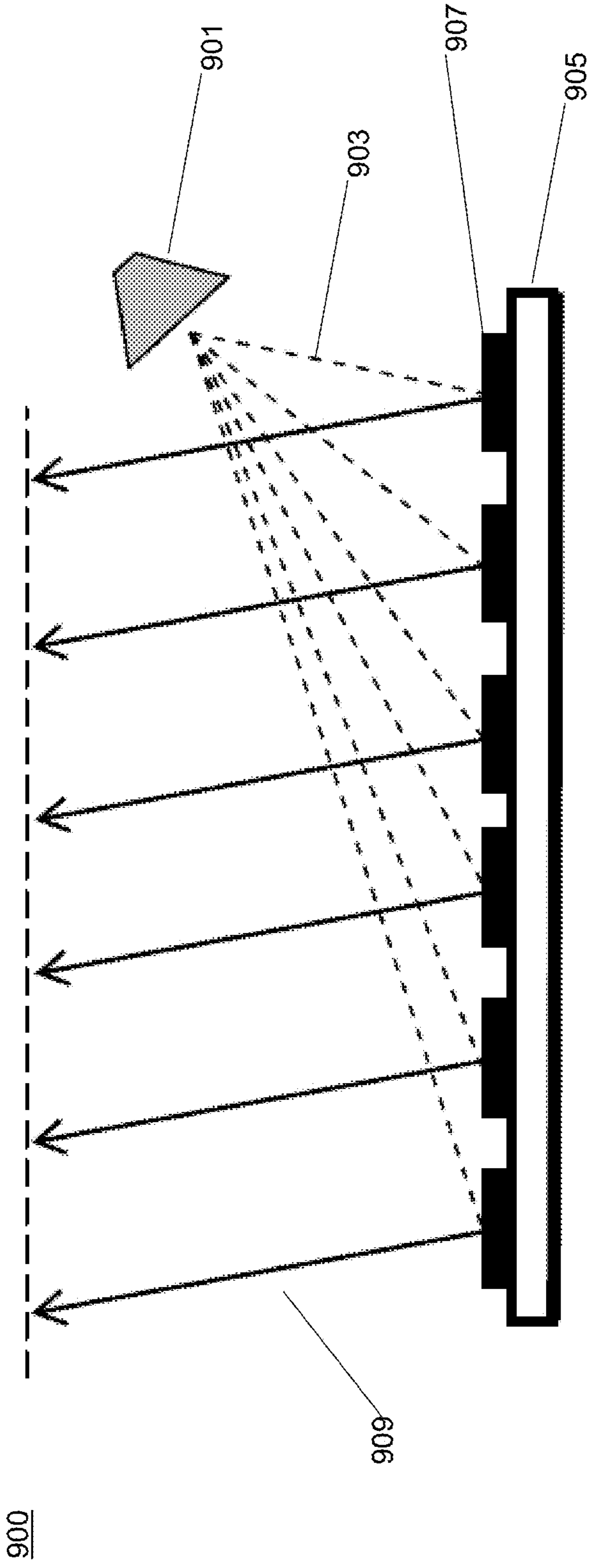
FIG. 9 is a schematic representation of a reflect array according to an example.

FIG. 9 is a schematic representation of a reflect array according to an example. The reflect array 900 comprises a feed antenna 901 configured to supply a signal 903 to be modified by a metasurface 905 comprising multiple unit cells 907, such as any of the unit cells described above. In the example of FIG. 9, the signal 903 is incident on (or 'illuminates') the metasurface 905.

As a result of the incident signal 903, a current is induced in the patch elements of the unit cells 907 of the metasurface 905, and reflection of the incident signal 903 is dictated by the pattern of the induced current, which can be controlled by adjusting the states of the individually addressable unit cells 907 of the metasurface 905. Thus, by changing the phase of the reflection coefficient the shape of a signal 909 that is scattered/reflected from the metasurface 909 can be changed. In the example of FIG. 9, the reflected signal 909 is in the form a plane wave. Alternatively, depending on the selected states of the unit cells 907, the reflected signal can be beam formed and so on, as described above.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The invention claimed is:

1. A multi-bit biasing structure for a unit cell of a metasurface, the multi-bit biasing structure comprising:

an active asymmetrically conducting device bridging a pair of electrically separated conductive patches defining a surface of the unit cell;

a plurality of illumination sources; and a plurality of photovoltaic elements arranged in parallel and configured to generate a biasing current to bias the active asymmetrically conducting device, the photovoltaic elements having different open circuit voltages and configured to be individually irradiated by separate ones of the illumination sources.

2. The multi-bit biasing structure of claim 1, wherein the plurality of illumination sources includes at least three illumination sources.

3. The multi-bit biasing structure of claim 2, wherein the illumination sources are individually addressable whereby to enable irradiation of the photovoltaic elements by one or more of the illumination sources.

4. The multi-bit biasing structure of claim 1, further comprising a spacing element to separate each of the illumination sources from each of the photovoltaic elements.

5. The multi-bit biasing structure of claim 1, wherein each of the photovoltaic elements is disposed on an inner face of the surface of the unit cell.

6. The multi-bit biasing structure of claim 1, wherein the active asymmetrically conducting device is disposed on an outer face of the surface of the unit cell.

7. The multi-bit biasing structure of claim 1, wherein an anode of the active asymmetrically conducting device is electrically connected to one of the pair of electrically separated patches, and a cathode of the active asymmetrically conducting device is electrically connected to another one of the pair of electrically separated patches.

8. The multi-bit biasing structure of claim 1, wherein the active asymmetrically conducting device is a PIN diode.

9. The multi-bit biasing structure of claim 1, wherein the active asymmetrically conducting device is a varactor diode.

10. The multi-bit biasing structure of claim 9, wherein the illumination sources are connected logically in parallel.

11. The multi-bit biasing structure of claim 1, wherein the plurality of photovoltaic elements includes at least three photovoltaic elements arranged in parallel.

12. The multi-bit biasing structure of claim 1, wherein each of the photovoltaic elements are configured to generate the biasing current.

13. The multi-bit biasing structure of claim 1, further comprising a ground plane.

14. The multi-bit biasing structure of claim 13, wherein the ground plane defines an aperture to receive at least one of the illumination sources, whereby to enable irradiation of at least one of the photovoltaic elements.

15. The multi-bit biasing structure of claim 13, wherein the ground plane is optically transparent and electrically conductive.

16. The multi-bit biasing structure of claim 14, further comprising a low-loss optically transparent structure so positioned as to define an optical coupling between at least one of the illumination sources and at least one of the photovoltaic elements.

17. The multi-bit biasing structure of claim 1, further comprising a spacing structure so configured as to direct light from at least one the illumination sources to at least one of the photovoltaic elements.

18. A unit cell of a metasurface, the unit cell comprising the multi-bit biasing structure of claim 1.

19. A reflect-array comprising a metasurface including an array of unit cells, the array including the unit cell of claim 18, the reflect-array configured to beamform a signal incident on the metasurface by controlling a phase of respective ones of the unit cells.

* * * * *